United States Patent [19]
Staton

[11] Patent Number: 6,072,417
[45] Date of Patent: Jun. 6, 2000

[54] DIGITAL INTEGRATION OF WIDE DYNAMIC RANGE SIGNALS

[75] Inventor: Kenneth Lawrence Staton, San Carlos, Calif.

[73] Assignee: Hewlett-Packard Company, Palo Alto, Calif.

[21] Appl. No.: 08/996,102

[22] Filed: Dec. 22, 1997

[51] Int. Cl.[7] .................................................. H03M 1/12
[52] U.S. Cl. ............................................................. 341/165
[58] Field of Search ................................... 341/165, 139, 341/158, 155

[56] References Cited

U.S. PATENT DOCUMENTS

| | | | |
|---|---|---|---|
| 2,617,042 | 11/1952 | Wouters | 250/83.3 |
| 3,422,435 | 1/1969 | Cragon et al. | 343/17.1 |
| 3,767,899 | 10/1973 | Barter | 235/61.6 A |
| 3,855,589 | 12/1974 | Staton | 341/139 |
| 4,030,038 | 6/1977 | Daniel et al. | 328/127 |
| 4,034,745 | 7/1977 | Bloom | 128/2.06 F |
| 4,622,468 | 11/1986 | Stefanski et al. | 250/458.1 |
| 4,692,890 | 9/1987 | Arseneau | 364/733 |
| 5,073,718 | 12/1991 | Paolella | 250/551 |

FOREIGN PATENT DOCUMENTS

| | | | |
|---|---|---|---|
| 601703 | 3/1978 | U.S.S.R. | G06G 7/18 |

OTHER PUBLICATIONS

Gross, T.B., "Digital–integrator for intrusion systems discriminates against false signals", Electronic Design, vol. 5, Mar. 1, 1977, pp. 74,76.

Bichler, H., "Long–Period Integrator Without Drift. Digital Integration with D/A Converters", Elektronik, No. 3, Feb. 12, 1982, p. 98.

*Primary Examiner*—Brian Young

[57] ABSTRACT

A digital integrator is disclosed that provides a wide dynamic range and extremely fast clearing of previous integration results. The digital integrator includes an analog-to-digital converter that generates a series of digitized representations of an electrical signal and further includes an ALU that generates an integration result by adding successive digitized representations in the series throughout an integration interval. The digital integrator includes circuitry for clearing the integration result from the ALU after completion of the integration interval in preparation for a subsequent integration interval on the electrical signal.

19 Claims, 3 Drawing Sheets

DIGITAL INTEGRATION OF WIDE DYNAMIC RANGE SIGNALS

BACKGROUND OF THE INVENTION

1. Field of Invention

The present invention pertains to the field of electronic circuits. More particularly, this invention relates to digital integration of wide dynamic range, high bandwidth signals.

2. Art Backaround

It is often useful in electronic systems to integrate an electrical signal. For example, an integration of an electrical signal may be useful in electronic systems that measure the emission of electrons or emission of various types of quantized radiation. Typically, a detector in such systems generates an electrical signal in response to a quantized emission. An integrator may be useful in such a system for determining a quantization count or an intensity value by integrating the electrical signal generated by the detector.

Prior integrators are typically realized using an analog circuit which includes an amplifier and a capacitor having a feedback configuration. Typically, an electrical signal being integrated is applied to an input of the amplifier and an electrical charge accumulates on the capacitor in response to the electrical signal. Typically, the integral of the electrical signal is indicated by an amount of electrical charge accumulated on the capacitor. The capacitor in an analog integrator must usually be discharged or reset prior to an integration operation.

Unfortunately, such analog integrators may be subject to errors caused by a residual charge on the capacitor. Such a residual charge may be caused by an incomplete discharge during reset of the capacitor. Moreover, such prior integrators may be subject to errors caused by leakage in the capacitor or charge accumulation on the capacitor due to bias currents in the amplifier.

In addition, the time required to discharge the capacitor may be relatively long due to the R-C time constant inherent in an analog integrator. Unfortunately, a relatively long discharge time usually limits the speed at which successive integration operations may be undertaken. Such a limitation may render such analog integrators unsuitable for systems in which the amount of time between integration intervals is very brief and in which the dynamic range of the electrical signal being integrated is relatively wide.

For example, an electronic system that measures light emitting from a surface commonly subdivides the surface into an array of pixel areas. Typically, such a system successively samples the light emitting from the pixel areas according to a particular pixel scan rate. In systems with a relatively high pixel scan rate the time between adjacent pixel areas is relatively brief. As a consequence, successive integration operations on an electrical signal that carry measurements from adjacent pixels must usually be undertaken relatively quickly. Unfortunately, analog integrators usually cannot be reset quickly enough to avoid integration errors caused by an incomplete capacitor discharge.

Moreover, such problems are usually worsened for signals having a wide dynamic range. Typically, an integration operation on a signal having a wide dynamic range using an analog integrator involves relatively long integration times and higher levels of charge accumulation on the capacitor. Such conditions typically increase the time required for capacitor discharge in preparation for the next integration interval. This usually slows the rate at which integration operations may occur and increases the likelihood of errors cause by incomplete capacitor discharge.

SUMMARY OF THE INVENTION

A digital integrator is disclosed that provides a wide dynamic range and extremely fast clearing of previous integration results. The digital integrator includes an analog-to-digital converter that generates a series of digitized representations of an electrical signal and further includes an ALU that generates an integration result by adding successive digitized representations in the series throughout an integration interval. The digital integrator includes circuitry for clearing the integration result from the ALU after completion of the integration interval in preparation for a subsequent integration interval on the electrical signal. The integration result may be cleared during a single cycle of the digital integrator.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
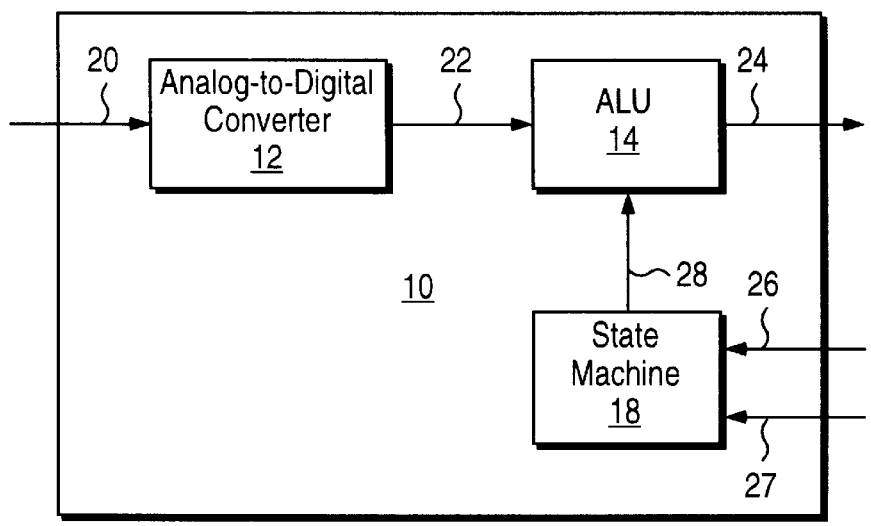
FIG. 1 shows one embodiment of a digital integrator that provides a wide dynamic range and extremely fast clearing of previous integration results.

FIG. 1 shows one embodiment of a digital integrator 10 that provides a wide dynamic range and extremely fast clearing of previous integration results. The digital integrator 10 includes an analog-to-digital converter 12, an arithmetic logic unit (ALU) 14, and a state machine 18.

The digital integrator 10 performs an integration operation on an electrical signal carried on an input signal line 20. In one embodiment, the electrical signal on the input signal line 20 has a voltage range between 0 and 1 volt which is adapted to the input range of the analog-to-digital converter 12.

The digital integrator 10 generates an integration result having a wide dynamic range which is carried on a set of output signal lines 24. In one embodiment, the dynamic range of the integration result on the output signal lines 24 is up to 32 bits.

The analog-to-digital converter 12 is a free-running circuit which is driven by a free-running clock in the digital integrator 10. The analog-to-digital converter 12 generates a series of digitized representations of the electrical signal carried on the input signal line 20. The analog-to-digital converter 12 generates a new digitized representation during each cycle of the free-running clock. The digitized representations are provided to the ALU 14 via a set of signal lines 22. In one embodiment, the analog-to-digital converter 12 generates the digitized representations at a rate of 25 MHz in response to a 25 MHz free-running clock.

The digitized representations carried on the signal lines 22 are received and accumulated by the ALU 14. The ALU 14 includes an input register that samples the signal lines 22. In one embodiment, the input register of the ALU 14 samples the signal lines 22 at a rate of 25 MHz in response to the free-running clock of the digital integrator 10. The ALU 14 includes circuitry for performing an addition and accumulation of each of the samples obtained by its input register and further includes an output register that holds the results of its add and accumulate operations. The circuitry for addition and accumulation and the loading and holding of the contents of the output register of the ALU 14 are controlled by a set of control signals 28 generated by the state machine 18.

The dynamic range of the digital integrator 10 is indicated by the range of values of the digitized representations which are accumulated by the ALU 14 and the number of those digitized representations that are accumulated during an integration operation. The dynamic range of the digital integrator 10 may be increased by increasing either the range of the digitized representations, i.e. by increasing the output bit width of the analog-to-digital converter 12, or by increasing the number of digitized representations accumulated during an integration operation, or by increasing both of these factors.

The dynamic range of the ALU 14 is preselected to prevent overflow according to the needs of the particular application in which the digital integrator 10 is employed. For example, if the digitized representations that are added and accumulated range from 0–n and the number of digitized representations added and accumulated during an integration operation is m, then the bit width of the ALU 14 is preselected to accumulate a magnitude of at least n*m in order to prevent overflow. In one embodiment, the dynamic range of the ALU 14 is preselected to provide a 32 bit range.

An integration operation performed by the digital integrator 10 takes place during an integration interval. The start of an integration interval is triggered by an integrator read signal 26. An assertion of the integrator read signal 26 causes the state machine 18 to assert the control signals 28 to clear a previous integration result from the ALU 14. The state machine 18 then asserts the control signals 28 so that the digitized representations sampled on the signal lines 22 are successively added and accumulated and loaded into the output register of the ALU 14.

The state machine 18 includes a register that stores an indication of the number of digitized representations obtained from the signal lines 22 to be accumulated during an integration interval. This register is referred to as the #samples register. The #samples register may store a constant value or may be programmable via a data path connection (not shown) to an external device such as a processor. For example, an external processor may program the #samples register to vary the dynamic range for the digital integrator 10.

The state machine 18 includes a down counter which is used to count down the value held in its #samples register. At the start of an integration interval the state machine 18 loads the contents of its #samples register into its down counter. During each successive addition of digitized representations, the state machine 18 decrements the down counter. When the down counter reaches zero, the state machine 18 disables the addition and the loading of the output register of the ALU 14. The contents of the output register in the ALU 14, the integration result, is then held for at least one clock cycle and may be read via the output signal lines 24. A read strobe 27, from for example an external processor, indicates that the integration results have been read from the output register of the ALU 14. Thereafter, a subsequent assertion of the integrator read signal 26 causes the state machine 18 to clear the now previous integration result from output register of the ALU 14 and begin accumulating the digitized representations on the signal lines 22 for a next integration interval.

The state machine 18 uses the control signals 28 to clear out the integration results from a previous integration interval, i.e. the results held in the output register of the ALU 14, in one cycle of the free-running clock of the digital integrator 10 after the completion of the previous integration interval. In one embodiment, the free-running clock runs at 25 MHz and one cycle is 40 nanoseconds. This very quick clearing or dumping of previous integration results enables the integration intervals to occur very quickly in comparison to analog integrators which require substantial amounts of time to clear previous results held by a charge on a capacitor.

In one embodiment, the state machine 18 also includes a register that holds an indication of the spacing or spread of the digitized representations used during an integration interval. This register is referred to as the #decimations register. The #decimations register may store a constant value or may be programmable. For example, an external processor may program the #decimations register to vary the dynamic range for the digital integrator 10 and to prevent overflow of the ALU 14 during an integration interval.

A value of N programmed into the #decimations register causes the state machine 18 to skip the addition of every $N^{th}$ digitized representation in an integration interval. The state machine 18 in this embodiment includes a down counter which is loaded with the value from its #decimations register at the start of each integration interval. This down counter decrements in response to each cycle of the free-running clock and a terminal count signal from this down counter is used to disable the add function of the ALU 14 via the control signals 28 for one cycle of the free-running clock.

Figure 2:
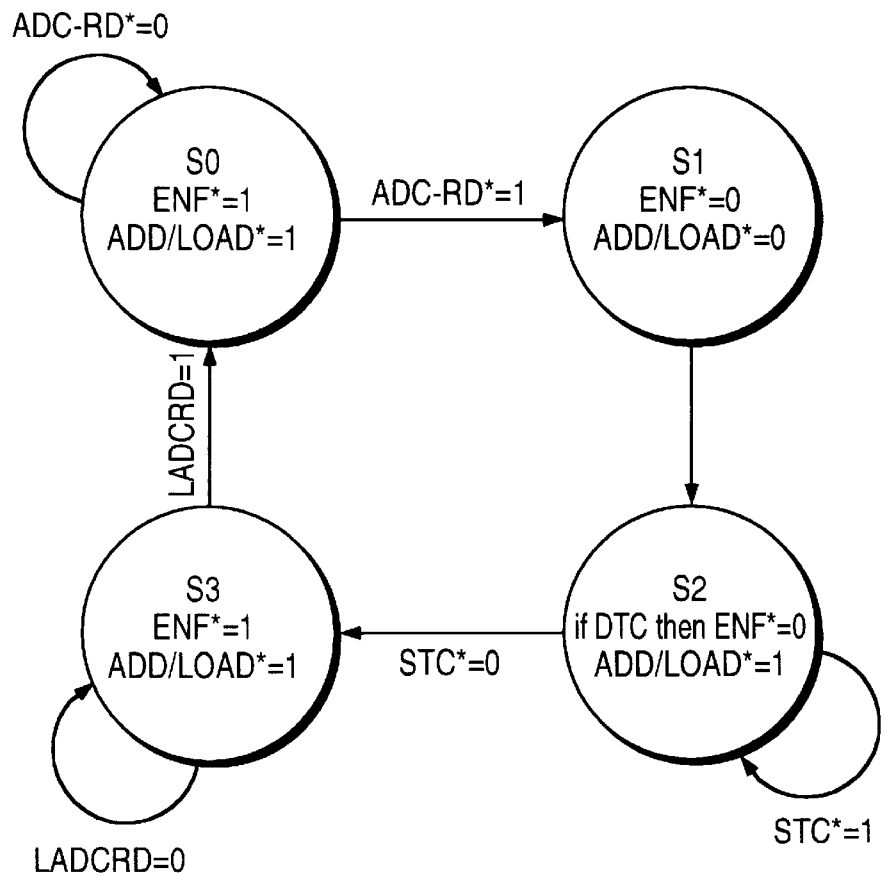
FIG. 2 is a state diagram showing the states and the state transitions of the state machine of a digital integrator in one embodiment.

FIG. 2 is a state diagram showing the states and the state transitions of the state machine 18 in one embodiment. The states of the state machine 18 in this embodiment include a set of states S0 through S3. The states S0 through S3 depict an ENF and an ADD/LOAD signal which are provided in an embodiment of the ALU 14 shown in FIG. 4.

In state S0, the state machine 18 waits for an assertion of the integrator read signal 26 (ADC-RD*) to complete. While in state S0, the state machine 18 uses the control signals 28 to disable the loading of results into the output register of the ALU 14 and to disable the add and accumulate function by the ALU 14. The integrator read signal 26 in this embodiment is asserted with an active low pulse the completion of which causes the state machine 18 to transition to state S1.

In state S1, the state machine 18 loads the value from its #samples register into its internal samples down counter and loads the value from its #decimations register into its internal decimations down counter. Also in state S1, the state machine 18 uses the control signals 28 to clear the previous integration results contained in its output register. The state machine 18 then transitions to the state S2 on the next clock cycle of the free-running clock of the digital integrator 10 to begin another integration interval. Thus, the previous integration results are cleared in only one cycle of the free running clock of the digital integrator 10 which amounts in one embodiment to 40 nanoseconds.

While in the state S2, the state machine 18 uses the control signals 28 to enable/disable successive additions of the digitized representations by the ALU 14. One digitized representation received via the signal lines 22 is added and accumulated to the output register of the ALU 14 during each clock cycle in which the decimations down counter has reached a terminal count as indicated by a DTC signal. During each clock cycle in state S2, the samples down counter decrements. The state machine 18 remains in the state S2 until the samples down counter decrements to all to way to zero in response to the free running clock in the digital integrator 10. When the samples down counter reaches zero as indicated by a terminal count (STC*) then the state machine 18 transitions to state S3.

The integration interval is terminated in the state S3. In state S3, the state machine 18 issues the control signals 28 to cause the output register of the ALU 14 to hold the integration results. During state S3, the integration results are available on the output signal lines 24 and may be read, for example by an external processor, using the read strobe 27 (LADCRD). The state machine 18 in state S3 waits for completion of the read strobe 27, the occurrence of which indicates that the integration results have been read, and then transitions back to state S0 in preparation for a subsequent integration interval.

Figure 3:
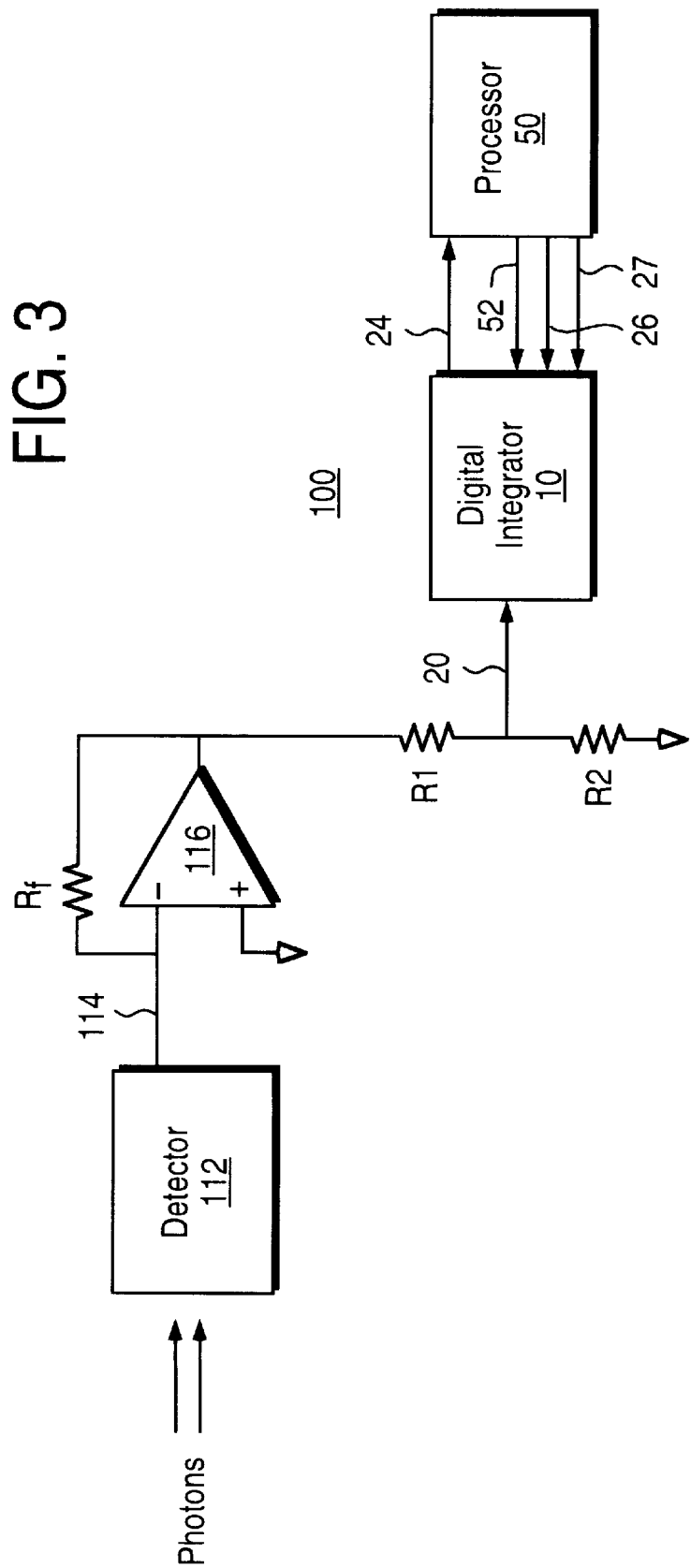
FIG. 3 shows a digital integrator used in a system which scans light being emitted from a surface.

FIG. 3 shows the digital integrator 10 used in a system 100 which scans light being emitted from a surface or image (not shown). The surface or image is subdivided into an array of pixels and the system 100 includes a detector 112 that detects photons of light emitted from each pixel. The detector 112 generates an electrical current on a signal line 114 in response to photons from sequentially scanned pixels.

In one embodiment, the pixels are scanned into the detector 112 at a rate of 5 microseconds per pixel. The desired dynamic range of an integration result for each pixel is 16 bits. In this application, an analog integrator is not suitable since the time required to discharge its previous integration results may consume most of the 5 microseconds available for integrating a subsequent pixel if the integration results have a wide dynamic range. The digital integrator 10 provides the desired dynamic range with appropriate selection of the dynamic range of its ALU 14 and setting of its #samples register and also provides fast single cycle clearing of previous integration results to easily accommodate the 5 microsecond per pixel scan rate in the system 100.

The electrical current on the signal line 114 which carries photon information for sequentially scanned pixels is converted to a voltage by an electrometer comprising an operational amplifier 116 with a feedback resistor $R_f$. The voltage output of the operational amplifier 116 is divided by a pair of resistors R1 and R2 which provide the signal to be integrated on the input signal line 20 of the digital integrator 10. This signal provides, in one embodiment, a series of 5 microsecond pixel intervals each of which is integrated by the digital integrator 10.

The system 100 includes a processor 50 that generates the integrator read signal 26. The processor 50 asserts a series of pulses of the integrator read signal 26 to correspond to a series of pixel intervals in which pixels are scanned into the detector 112. The completion of each pulse of the integrator read signal 26 occurs at the start of a corresponding pixel interval of the electrical signal on the input signal line 20. This causes the digital integrator 10 to start each integration interval at the start of a pixel interval.

The processor 50 generates the read strobe 27 to read the integration results from the digital integrator 10 via the output signal lines 24 at the end of each integration interval. In one embodiment, the processor 50 reads 16 bits of the 32 bit integration results available on the output signal lines 26.

The processor 50 also provides a data path 52 which it uses to write the number of digitized representations value into the #samples register in the digital integrator 10. The data path 52 may also be used to write a value into the #decimations register of the digital integrator 10.

In one embodiment, each integration interval as controlled by the integration read signal 26 has a duration of approximately 5 microseconds. The digital integrator 10 samples the signal line 20 at a rate of 25 MHz which yields 125 digitized representations which may be integrated during each integration interval. Accordingly, the processor 50 writes a value equal to 125 into the #samples register of the digital integrator 10. This causes the state machine to accumulated 125 digitized representations of the signal from the detector 112 during each integration interval.

The processor 50 may optionally program the #decimation register in the digital integrator 10. A value of N programmed into the #decimations register causes the digital integrator 10 to skip every $N^{th}$ digitized representation in an integration interval while performing an integration. This allows the processor 50 to spread fewer samples throughout the duration of an integration interval while avoiding overflow of the digital integrator 10.

Figure 4:
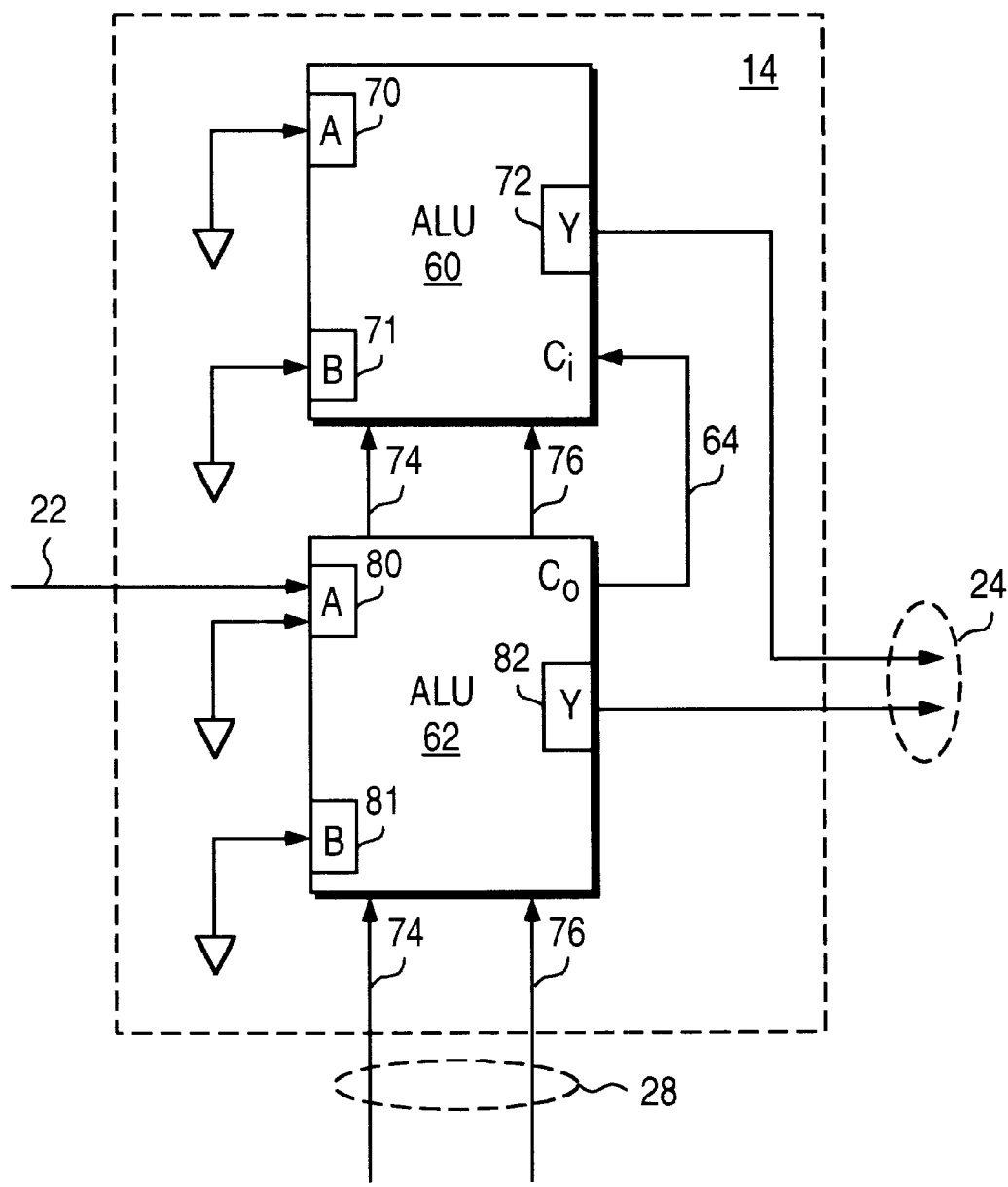
FIG. 4 illustrates one implementation of the ALU of a digital integrator.

FIG. 4 illustrates one implementation of the ALU 14 of the digital integrator 10. The ALU 14 in this implementation includes a pair of 16 bit ALUs 60 and 62.

The ALU 60 provides a pair of 16 bit inputs 70 and 71 which are referred to as its A and B inputs. The ALU 60 generates a 16 bit output 72 which is referred to as its Y output. Similarly, the ALU 62 provides a pair of 16 bit inputs 80 and 81, its A and B inputs, and a 16 bit output 82, its Y output. A carry out $C_o$ output of the ALU 62 is coupled to a carry in $C_i$ input of the ALU 60 via a signal line 64.

The signal lines 22 from the analog-to-digital converter 12 carry 12 bit digitized representations. These 12 bits are coupled into the lower 12 or 12 least significant bits of the A input to the ALU 62. The upper 4 or 4 most significant bits of the A input of the ALU 62 are set to constant zeros. The B input of the ALU 62 is set to constant zero. The A and B inputs of the ALU 60 are both zero.

The control signals 28 from the state machine 18 include an ADD/LOAD* signal 74 and an enable F (ENF*) signal 76 which are provided to both the ALUs 60 and 62. In state S1, the state machine 18 uses the ADD/LOAD* signal 74 and the ENF* signal 76 to clear out the previous results held in the Y outputs of the ALUs 60 and 62. In state S2, the ADD/LOAD* signal 74 and the ENF* signal 76 are used by the state machine 18 to cause the ALU 62 to add its B input, the next digitized representation carried on the signal lines 22, to its previously accumulated values and store the results in its output register for its Y output 82. Also while in state S2, the ADD/LOAD* signal 74 and the ENF* signal 76 are used by the state machine 18 to cause the ALU 60 to add its $C_i$ input to its previously accumulated values and to store the result in its output register for its Y output 72. In state S3, the state machine 18 uses the ENF* signal 76 to hold the integration results in the Y output registers of the ALUs 60 and 62 while waiting for the read strobe signal 27.

In an embodiment such as the system 100 in which a particular 16 bits of the 32 bits available from the outputs of the ALUs 60 and 62 are used, the output signals 24 carry the upper or most significant 12 bits from the Y output of the ALU 62 and the lower or least significant 4 bits of the Y output of the ALU 60.

In one alternative implementation, the ALU 62 may be replaced with a 16 bit counter that counts the $C_o$ output of the ALU 60.

The number of individual ALUs or ALUs and counters needed to implement the ALU 14 can vary according to the dynamic range needed for a particular application. For example, another 8 or 16 bit ALU or counter may be attached to a carry out $C_o$ output from the ALU 60 to provide additional dynamic range as needed.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A digital integrator, comprising:

analog-to-digital converter that generates a series of digitized representations of an electrical signal;

ALU that generates an integration result by adding successive digitized representations in the series throughout an integration interval;

circuitry for clearing the integration result from the ALU after completion of the integration interval in preparation for a subsequent integration interval on the electrical signal.

2. The digital integrator of claim 1, wherein the circuitry for clearing includes a #samples register that holds a value indicating a number of the digitized representations to be integrated during the integration interval.

3. The digital integrator of claim 1, wherein a dynamic range of the ALU is preselected to prevent an overflow of the integration result in the ALU.

4. The digital integrator of claim 1, wherein the circuitry for clearing includes a #decimations register that holds a value indicating a spread of the digitized representations to be integrated during the integration interval.

5. The digital integrator of claim 1, wherein the circuitry for clearing clears the integration result in one cycle of a clock that drives the analog-to-digital converter.

6. The digital integrator of claim 1, wherein the ALU comprises a first ALU that adds successive digitized representations in the series and a second ALU that accumulates a carry out from the first ALU.

7. The digital integrator of claim 1, wherein the ALU comprises an ALU that adds successive digitized representations in the series and a counter that counts a carry out from the first ALU.

8. An imaging system, comprising:

means for generating an electrical signal in response to emissions from a series of pixel areas of an image;

digital integrator that generates an integration result for each pixel area in response to the electrical signal, the digital integrator having circuitry for clearing each integration result after completion of the corresponding integration interval in preparation for a subsequent integration interval on the electrical signal.

9. The imaging system of claim 8, wherein the digital integrator comprises:

analog-to-digital converter that generates a series of digitized representations of the electrical signal;

ALU that generates each integration result by adding successive digitized representations in the series throughout each integration interval.

10. The imaging system of claim 9, wherein the circuitry for clearing includes a #samples register that holds a value indicating a number of the digitized representations to be integrated during each integration interval.

11. The imaging system of claim 9, wherein a dynamic range of the ALU is preselected to prevent an overflow of each integration result in the ALU.

12. The imaging system of claim 9, wherein the circuitry for clearing includes a #decimations register that holds a value indicating a spread of the digitized representations to be integrated during each integration interval.

13. The imaging system of claim 9, wherein the circuitry for clearing clears the integration result in one cycle of a clock that drives the analog-to-digital converter.

14. The imaging system of claim 9, wherein the ALU comprises a first ALU that adds successive digitized representations in the series and a second ALU that accumulates a carry out from the first ALU.

15. The imaging system of claim 9, wherein the ALU comprises a first ALU that adds successive digitized representations in the series and a counter that counts a carry out from the first ALU.

16. A method for digital integration, comprising the steps of:

generating a series of digitized representations of an electrical signal;

generating an integration result by adding successive digitized representations in the series throughout an integration interval;

clearing the integration result after completion of the integration interval in preparation for a subsequent integration interval on the electrical signal.

17. The method of claim 16, wherein the step of clearing includes the step of counting down a value that indicates a number of the digitized representations to be integrated during the integration interval.

18. The method of claim 16, wherein the step of clearing includes the step of counting down a value that indicates a spread of the digitized representations to be integrated during the integration interval.

19. The method of claim 16, wherein the step of clearing comprises the step of clearing the integration result in a time period substantially equal to a time period in which each digitized representation is generated.

\* \* \* \* \*